United States Patent
Wong et al.

(10) Patent No.: US 9,230,002 B2
(45) Date of Patent: Jan. 5, 2016

(54) HIGH PERFORMANT INFORMATION SHARING AND REPLICATION FOR SINGLE-PUBLISHER AND MULTIPLE-SUBSCRIBER CONFIGURATION

(75) Inventors: Lik Wong, Union City, CA (US); Nimar Arora, Union City, CA (US); Lei Gao, Foster City, CA (US); Thuvan Hoang, Santa Clara, CA (US); Haobo Xu, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 743 days.

(21) Appl. No.: 12/363,557

(22) Filed: Jan. 30, 2009

(65) Prior Publication Data

US 2010/0198920 A1    Aug. 5, 2010

(51) Int. Cl.
| | | |
|---|---|---|
| G06F 17/00 | (2006.01) | |
| G06F 7/00 | (2006.01) | |
| G06F 17/30 | (2006.01) | |
| G06F 9/54 | (2006.01) | |

(52) U.S. Cl.
CPC .......... *G06F 17/30578* (2013.01); *G06F 9/544* (2013.01); *G06F 9/546* (2013.01)

(58) Field of Classification Search
CPC .... G06F 9/526; G06F 13/14; G06F 2209/548
USPC .................................. 707/613, 624, 625, 627
See application file for complete search history.

(56) References Cited

U.S. PATENT DOCUMENTS

| | | | |
|---|---|---|---|
| 5,235,700 A | 8/1993 | Alaiwan et al. | |
| 5,418,913 A | 5/1995 | Fujimoto | |
| 5,859,992 A * | 1/1999 | Tran et al. | 712/204 |
| 5,870,761 A | 2/1999 | Demers et al. | |
| 5,881,216 A * | 3/1999 | Johnson | 714/15 |
| 5,941,975 A * | 8/1999 | Park et al. | 710/200 |
| 5,991,771 A | 11/1999 | Falls et al. | |
| 6,029,178 A | 2/2000 | Martin et al. | |
| 6,029,217 A * | 2/2000 | Arimilli et al. | 710/107 |
| 6,173,373 B1 * | 1/2001 | Bonola | 711/147 |
| 6,178,472 B1 * | 1/2001 | Carpenter et al. | 710/54 |
| 6,289,343 B1 | 9/2001 | Freund et al. | |
| 6,430,191 B1 * | 8/2002 | Klausmeier et al. | 370/412 |
| 6,430,577 B1 | 8/2002 | Hart | |
| 6,553,419 B1 * | 4/2003 | Ram | 709/224 |

(Continued)

OTHER PUBLICATIONS

IBM, "Replication Guide and Reference," 2000, IBM, Version 7, pp. i-xx, 8-9, 46, 54-55, 142-143.

(Continued)

*Primary Examiner* — Pavan Mamillapalli
(74) *Attorney, Agent, or Firm* — Hickman Palermo Becker Bingham Wong LLP; Marcel K. Bingham (57) ABSTRACT

A method for sharing information between a publisher and multiple subscribers is provided. The publisher uses a latch-free, single publisher, multiple subscriber shared queue to share information. Logical change records representing changes made to a database are enqueued in the shared queue as messages in a stream of messages, and subscribers read the logical change records. Subscribers may filter logical change records before sending to apply processes for processing. An identifying property of the source instance of a change encapsulated in a logical change record may be included with each message enqueued.

36 Claims, 6 Drawing Sheets

(56) References Cited

U.S. PATENT DOCUMENTS

| | | | |
|---|---|---|---|
| 6,584,477 B1 | 6/2003 | Mosher | |
| 6,662,213 B1 * | 12/2003 | Xie et al. | 709/206 |
| 6,751,573 B1 * | 6/2004 | Burch | 702/178 |
| 6,804,672 B1 | 10/2004 | Klein et al. | |
| 6,874,104 B1 | 3/2005 | Josten et al. | |
| 6,889,231 B1 * | 5/2005 | Souder et al. | 707/999.01 |
| 6,907,479 B2 * | 6/2005 | Karnstedt et al. | 710/52 |
| 6,980,988 B1 | 12/2005 | Demers et al. | |
| 7,031,974 B1 | 4/2006 | Subramaniam | |
| 7,130,936 B1 * | 10/2006 | Baines et al. | 710/53 |
| 7,219,198 B2 * | 5/2007 | Sivaram et al. | 711/150 |
| 7,257,687 B2 * | 8/2007 | Au et al. | 711/156 |
| 7,412,572 B1 * | 8/2008 | Shavit et al. | 711/152 |
| 7,526,583 B2 * | 4/2009 | Mack et al. | 710/54 |
| 7,529,886 B2 * | 5/2009 | Emmes et al. | 711/114 |
| 7,533,221 B1 * | 5/2009 | Doherty et al. | 711/147 |
| 7,668,878 B2 | 2/2010 | Arora et al. | |
| 7,769,714 B2 | 8/2010 | Lu et al. | |
| 7,779,418 B2 * | 8/2010 | Surlaker et al. | 719/314 |
| 7,783,601 B2 | 8/2010 | Wong et al. | |
| 7,801,852 B2 | 9/2010 | Wong et al. | |
| 7,856,420 B2 * | 12/2010 | Zargham et al. | 707/627 |
| 2002/0059165 A1 | 5/2002 | Hersh et al. | 707/1 |
| 2002/0144006 A1 * | 10/2002 | Cranston et al. | 709/312 |
| 2005/0120355 A1 | 6/2005 | Kraft et al. | |
| 2006/0004876 A1 | 1/2006 | Matsunami et al. | |
| 2006/0080394 A1 | 4/2006 | Goodman et al. | |
| 2006/0167960 A1 | 7/2006 | Lomet | |
| 2006/0187836 A1 * | 8/2006 | Frey et al. | 370/235 |
| 2007/0053359 A1 | 3/2007 | Wu et al. | |
| 2007/0198788 A1 | 8/2007 | Hsien et al. | |
| 2008/0005189 A1 | 1/2008 | Omura | |
| 2008/0027987 A1 | 1/2008 | Arora et al. | |
| 2008/0228833 A1 | 9/2008 | Kano | |
| 2009/0037494 A1 | 2/2009 | Wong et al. | |
| 2009/0141629 A1 | 6/2009 | Gerosa et al. | |
| 2009/0249356 A1 * | 10/2009 | He et al. | 719/314 |
| 2011/0010392 A1 | 1/2011 | Wong et al. | |
| 2012/0109910 A1 | 5/2012 | Netz et al. | |

OTHER PUBLICATIONS

U.S. Appl. No. 12/853,991, filed Aug. 10, 2010, Final Office Action, Sep. 22, 2011.

U.S. Appl. No. 11/831,478, filed Jul. 31, 2007, Office Action, May 22, 2013.

IBM, "Replication Guide and Reference," 2000, IBM, Version 7, 27 pages.

U.S. Appl. No. 12/853,991, filed Aug. 10, 2010, Notice of Allowance.

* cited by examiner

FIG. 1A  Database System 100

HIGH PERFORMANT INFORMATION SHARING AND REPLICATION FOR SINGLE-PUBLISHER AND MULTIPLE-SUBSCRIBER CONFIGURATION

This application is related to U.S. patent application Ser. No. 11/831,447, entitled "CHECKPOINT-FREE IN LOG MINING FOR DISTRIBUTED INFORMATION SHARING", filed by LIK WONG et al. on Jul. 31, 2007, the entire contents of which is hereby incorporated by reference.

This application is related to U.S. Pat. No. 6,980,988, entitled "METHOD OF APPLYING CHANGES TO A STANDBY DATABASE SYSTEM", filed by Alan J. Demers, et al. on Oct. 1, 2002, the entire contents of which is hereby incorporated by reference.

This application is related to U.S. patent application Ser. No. 11/831,478, entitled "COMBINING CAPTURE AND APPLY IN A DISTRIBUTED INFORMATION SHARING SYSTEM", filed by LIK WONG et al. on Jul. 31, 2007, the entire contents of which is hereby incorporated by reference.

FIELD OF THE INVENTION

The present invention relates to database systems and, more specifically, database systems that support information sharing through log mining.

BACKGROUND

Clustered Database Systems/Multi-Node Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. One non-limiting database language supported by many database servers is SQL, including proprietary forms of SQL supported by such database servers as ORACLE, (e.g. ORACLE Database 10 g). SQL data definition language ("DDL") instructions are issued to a database server to create or configure database objects, such as tables, views, or complex data types.

A clustered database management system is made up of interconnected nodes that share and manage access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a clustered database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

A clustered database system is an example of a multi-node database system. In a multi-node database system, all the nodes are interconnected via, for example, a network. However, one set of nodes in the multi-node database system may run database servers that manage a database differently than a database managed by database servers running on a different set of nodes in the multi-node database system.

Distributing Change Information

A database system generates redo logs. These redo logs, for example, may record operations performed by a stream of transactions executed by the database system. Information mined from redo logs can be utilized in a variety of ways. For instance, such information can be utilized for replication, auditing, asynchronous event deliveries, asynchronous change data capture, and database restoration.

Typically, the sharing of mined information from redo logs may be accomplished by using a publisher-subscriber model. In such a model, one or more publisher processes are deployed at one or more source nodes (for example, local database systems that are part of the overall distributed database system) to mine the redo logs at the source nodes, while one or more subscriber processes are deployed at one or more destination nodes (for example, a remote database system that is also a part of the same overall distributed database system) to consume in parallel the results from the publishers. In between the publishers and the subscribers, intermediate processes (such as propagation processes) may be used to transfer the results in streams from the publishers to the subscribers. More specifically, under this model, results from mining may be placed in a first staging area at the source nodes by the publisher processes. The mining results may be read from the first staging area at the source nodes, and transferred to a second staging area at the destination nodes, by the propagation processes. Finally, the mining results in the second staging area may be accessed, and applied at the destination nodes, by the apply processes.

Latches

Generally speaking, multiple processes may concurrently access the same staging area (such as the second staging area at the destination nodes) for the purpose of reading and writing into the area. Accordingly, a latch mechanism is typically used for the purpose of coordinating concurrent accesses to such a staging area to prevent incompatible memory accesses by various processes. As used herein, the term "latch" refers to a mechanism that provides coordination to multiple access requesters to a shared resource. In particular, where a resource is shared among access requesters whose access rights to the resource may conflict, a latch usually needs to be taken (or granted) before any such access requester can access the resource. Usually, latches create overhead and slows down concurrent access to the shared resource. An example of latch may be a lock, a semaphore, etc.

A process will utilize a latch mechanism to obtain a latch when accessing the staging area. Since the staging area is a shared resource (which, for example, may be implemented in the form of a shared memory segment) between the multiple processes, interference among the processes may occur. For example, a particular record in the mining results may be locked by a process. As a result, memory space occupied by the particular record may not be available for other uses (such as storing new mining results) or for other processes.

Combined Capture and Apply

A combined capture and apply (CCA) mechanism includes a single capture process directly communicating with a single apply process at a destination. A single in-memory latchless queue serves as a staging area at the destination for mining results that are propagated to the apply process from the single capture process. Thus, the apply process receives a stream of mining results from the capture process using a latchless queue.

In some applications, the mining results are made available to a plurality of apply processes, and not just a single apply process. A CCA mechanism may only allow a capture process to interact directly with a single apply process. To work around this restriction, multiple capture processes can be configured, each producing results from a specific instance and sending them to the single apply process configured for that instance. In this manner, the apply processes may split the task of applying the received changes. However, the application developer must manage the streams of mining results. This manual configuration process is tedious, prone to errors, and complicates the design of applications that utilize multiple source instances.

Therefore, a better mechanism, which would better support distributed information sharing through log mining, is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for distributing information from a single publisher of information to subscribers of the information. In an embodiment, an enqueuing process mines redo logs to produce logical change records (LCRs), and places the LCRs into a shared queue. An LCR represents change information, for changes that were made to a database. In an embodiment, each of the LCRs is a message in a stream of messages, and each message is enqueued as an entry in the shared queue. The shared queue is a latch-free, single publisher, multiple subscriber queue. In an embodiment, the shared queue is implemented using a buffer, which serves as a logical circular queue for each of the subscribers.

Each subscriber is a consumer of messages. Each subscriber consumes an entry by reading and dequeuing an entry. Each subscriber reads an entry from the shared queue by "browsing" the respective logical circular queue of the subscriber. Calling a browse function returns an entry from the respective logical circular queue of the subscriber. Each subscriber keeps a logical queue within the buffer by maintaining a head pointer to the next entry to be read. Each subscriber dequeues the entry by advancing the subscriber's respective head pointer to the next slot in the buffer.

The enqueuing process is a producer of messages. The enqueuing process maintains a tail pointer into the buffer to keep track of where, in the buffer, to enqueue the next entry. If any of the subscribers have a full logical queue, the enqueuing process waits until a entry is available to enqueue an entry.

In other embodiments, the information distributed by the publisher are not LCRs but may be any type of data that must be distributed to all subscribers. In some embodiments, the subscribers receive all the entries but filters out and discards entries that are not relevant to that particular subscriber.

In an embodiment, propagation senders are subscribers that automatically partition each message read from the shared queue according to an instance that is the source of a change represented in the message. The propagation senders partitions messages by distributing each message so that only the appropriate apply process will receive the message. In an embodiment, the enqueuing process provides, for each message, a source instance number used to partition for distribution each message.

Example System Architecture

Figures 1, 1B:
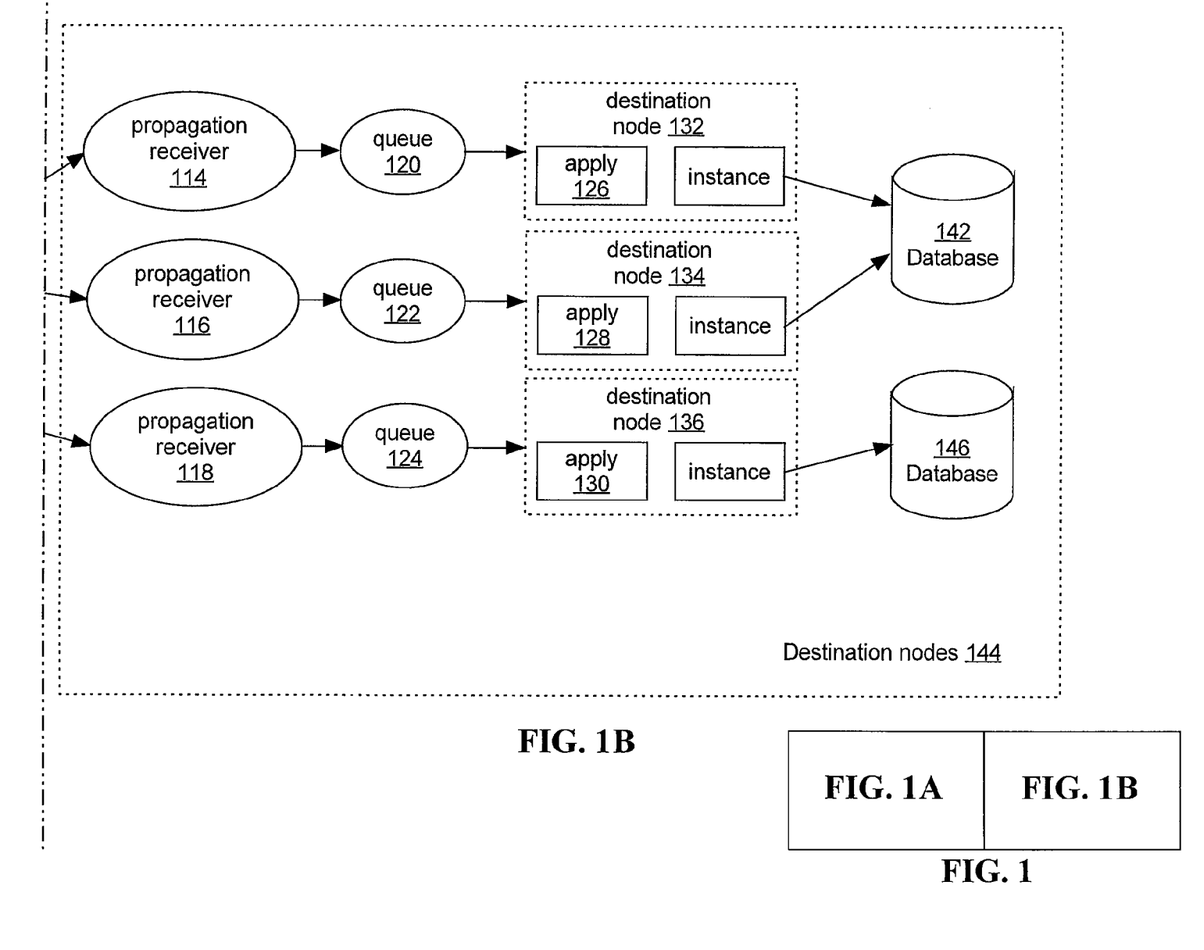
FIG. 1 is a block diagram of an example database system in accordance with an embodiment of the present invention.
Figure 1A:
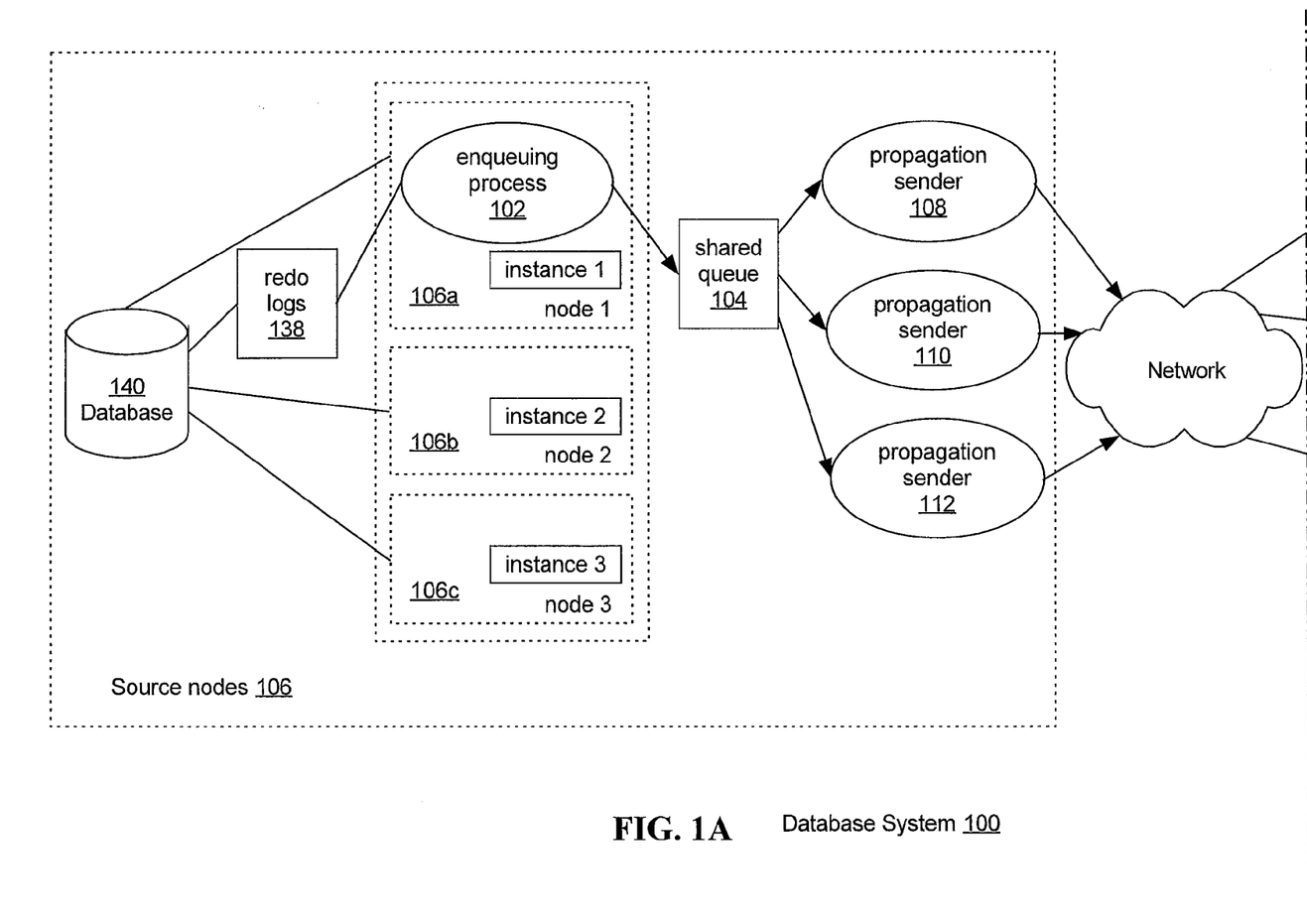

FIG. 1 illustrates an example database system 100 that comprises a shared queue 104 for information sharing between one or more source nodes 106 (including node 106a, node 106b, and node 106c) and one or more destination nodes 144, which includes node 132, node 134, and node 136, in accordance with an embodiment. The database system 100 may be of any type. For example, the database system 100 may be, but is not limited to, a distributed database system that comprises multiple database systems. In such a distributed database system, the source nodes 106 may be a local database system while the destination nodes 132, 134, 136 may be remote database systems.

An enqueuing process (also known as a "mining process" or a "capture process") 102 may be deployed at a source node 106a to mine change information in one or more redo logs 138. In some embodiments, the one or more redo logs 138 contain change information from multiple instances. Usually there is one instance per node. In some cases, multiple instances execute on each source or destination node. The one or more redo logs 138 are a record of operations belonging to a stream of local transactions performed at source database 140. The change information mined from the one or more redo logs 138 are streamed from the enqueuing process 102 to apply processes 126, 128, 130 in a continuous stream of messages. Although a single source database 140 is depicted in FIG. 1, in some embodiments, the redo log 138 may reflect operations belonging to transactions performed at multiple source databases.

Apply processes 126, 128, 130 are deployed at the destination nodes 132, 134, 136. The apply processes 126, 128, 130 ultimately apply the mined change information to one or more databases. Multiple apply processes may apply to the same database. Each apply process may apply to a different database. For example, in FIG. 1, apply processes 126, 128 apply to database 142, and apply process 130 applies to database 146. The apply processes may be, but are not limited to, data replication processes. Each apply process may be executing on a separate instance. In an embodiment, enqueuing process 102 enqueues the information mined from the one or more redo logs 138 into shared queue 104.

In some embodiments, subscribers of entries in shared queue 104 are one or more propagation senders 108, 110, 112. The propagation senders 108, 110, 112 send messages read from shared queue 104 to propagation receivers, such as propagation receivers 114, 116, and 118. In some embodiments, propagation senders 108, 110, 112 filter messages and send only a subset of the messages read from shared queue 104 to propagation receivers. The propagation receivers each further utilizes a queue to share messages with an apply process. In FIG. 1, propagation receivers 114, 116, and 118 uses the queues 120, 122, and 124 to share messages with the apply processes 126, 128, and 130, respectively. Each of destination nodes 132, 134 and 136 may have an instance executing on each destination node.

In FIG. 1, the components depicted within source nodes 106 may be found on any node that is a part of source nodes 106. The components depicted within destination nodes 144 may be found on any node that is a part of destination nodes 144. In some embodiments, source nodes 106 and destination nodes 144 each contain more nodes than are depicted in FIG. 1, and some of the additional nodes not depicted host some of the components depicted in FIG. 1.

Flow Overview

Figure 2:
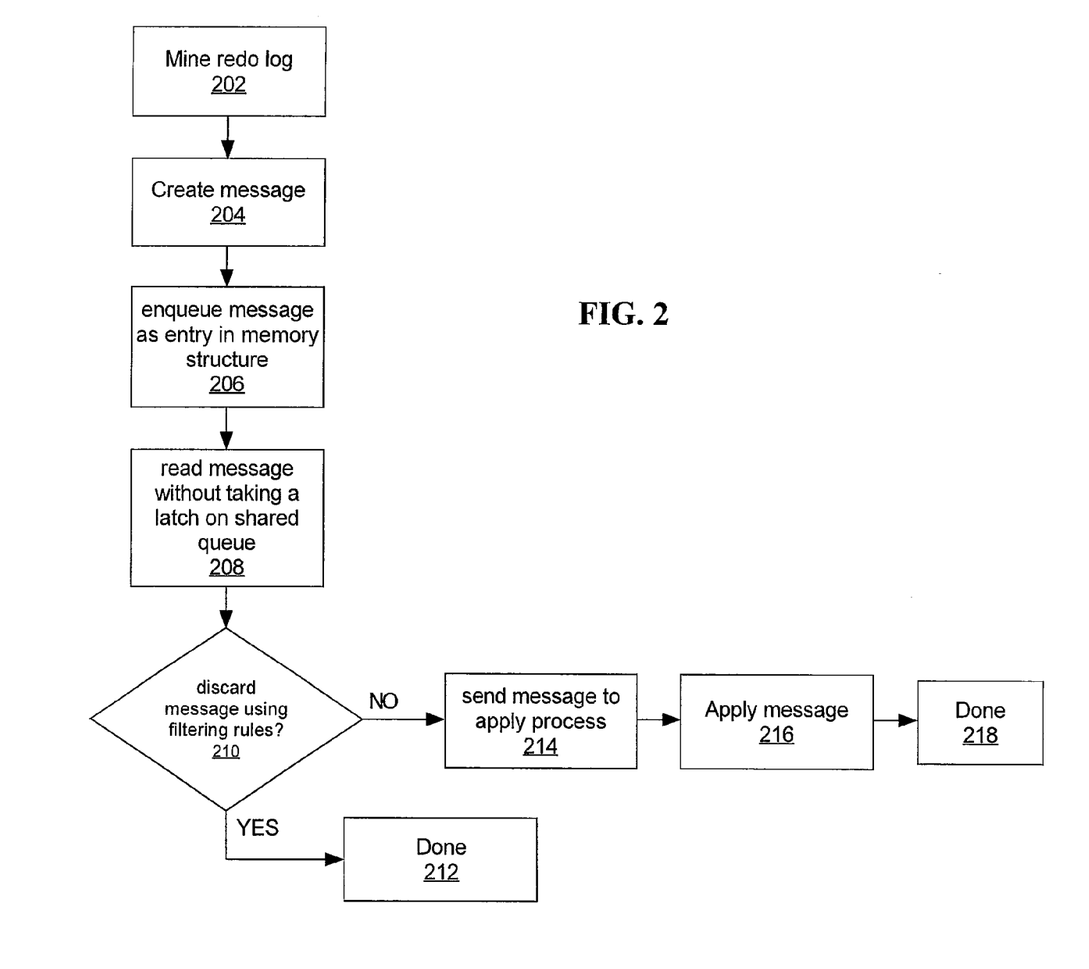
FIG. 2 illustrates a technique for streaming information, in accordance with an embodiment.

FIG. 2 illustrates a technique for streaming information, in accordance with an embodiment. As depicted in FIG. 2, in step 202, enqueuing process 102 mines a redo log 138. In step 204, enqueuing process 102 creates a message. In step 206, enqueuing process 102 enqueues the message as an entry in shared queue 104. In step 208, each of propagation senders 108, 110, and 112 reads the message from shared queue 104 without taking a latch on shared queue 104. In step 210, each of the propagation senders 108, 110, and 112 decides whether to discard the message using filtering rules. In step 212, each propagation sender that discards the message is finished with the message. In step 214, each propagation sender that does not discard the message sends the message to an apply process. In step 216, each apply process that receives the message applies the message to a database. In step 218, the message processing is finished. In some embodiments, only one propagation sender does not discard the message. In some embodiments, only one apply process receives the message. In an embodiment, every propagation sender performs steps 208 and 210.

Shared Queue

Figure 3:
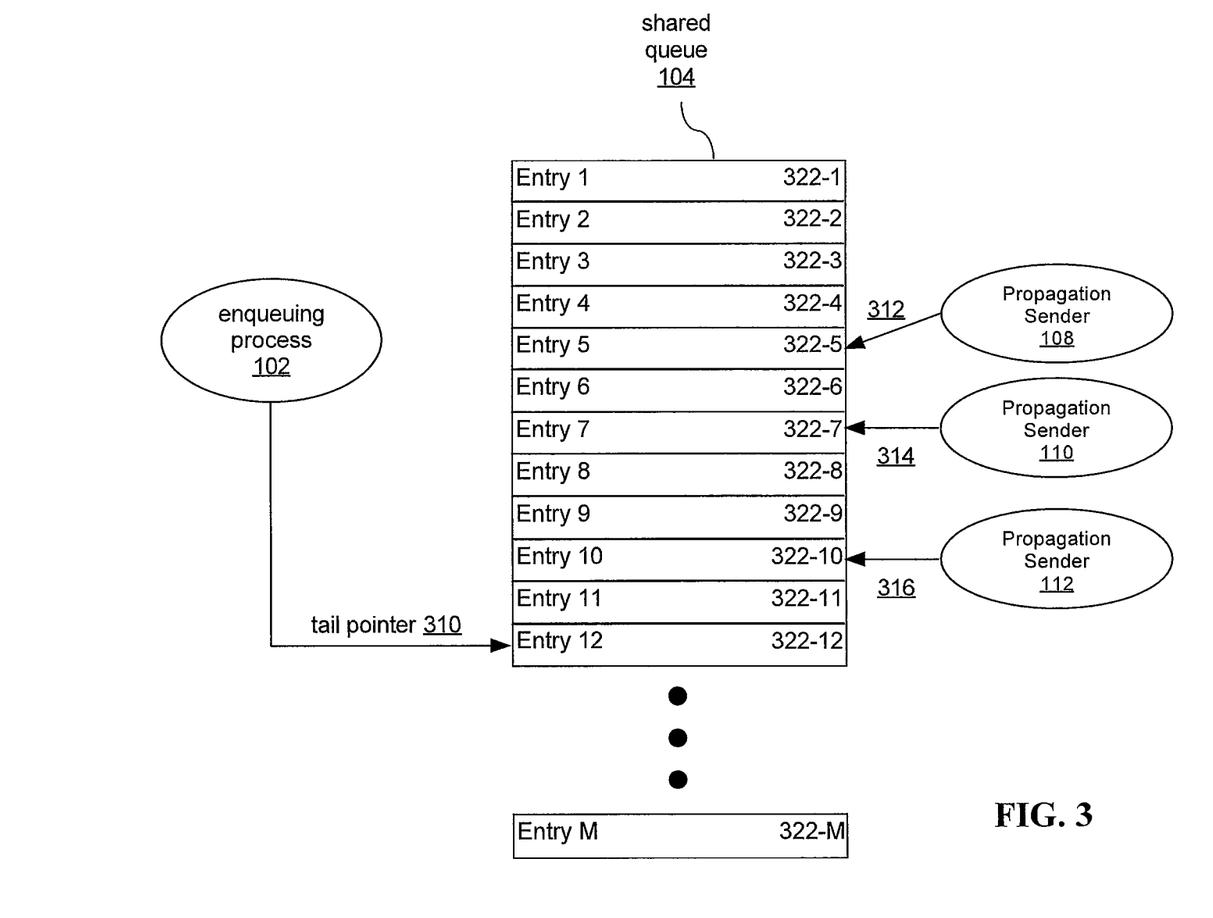
FIG. 3 is a block diagram of an example latch-free, single publisher, multiple subscriber shared queue, according to an embodiment.

FIG. 3 is a block diagram of an example latch-free, single publisher, multiple subscriber shared queue 104, according to an embodiment. FIG. 3 depicts an enqueuing process 102, and multiple propagation senders such as propagation senders 108, 110, and 112. The single publisher is enqueuing process 102. The multiple subscribers in the example of FIG. 3 are propagation senders 108, 110, and 112. Although the examples described herein use three subscribers, embodiments of the invention are not limited to three subscribers and may have any number of subscribers.

As illustrated in FIG. 3, shared queue 104 comprises a number of entries 322 (1 through M). In an embodiment, the number of entries is configurable. Each of entries 322 may represent a message record (e.g. LCR). An embodiment of the present invention is not limited to any particular message containing any particular kind of content. Shared queue 104 may be an in-memory queue. In some embodiments, each of entries 322 contains a field with a value that indicates whether the entry 322 is empty or is occupied. The enqueuing process 102 is the only publisher that enqueues messages as entries in shared queue 104. In some embodiments, all the propagation senders 108, 110, 112 read messages from shared queue 104.

Each entry in shared queue 104 is a message in a continuous stream of messages. Each subscriber reads the continuous stream of messages in the order that the messages were enqueued. Every subscriber reads all messages that were enqueued. Each subscriber reads the same continuous stream of messages from shared queue 104. In some embodiments, some subscribers may choose to filter the stream of messages that the subscriber forwards to propagation receivers.

Enqueuing process 102 creates messages for enqueuing in shared queue 104 by mining redo logs 120 for change information. The change information is represented by redo records. Enqueuing process 102 enqueues a message as a queue entry into shared queue 104. Propagation senders 108, 110 and 112 read the queue entries.

Each message is enqueued as a queue entry in shared queue 104. The stream of messages are distributed from enqueuing process 102 to the propagation senders 108, 110, 112 using shared queue 104, and, subject to possible filtering by some of the propagation senders, a stream of messages continues onwards to apply processes at destination nodes, where the stream of messages are processed. In an embodiment, processing the stream of messages means applying the messages to a destination database. An apply process "applies a message" if the apply process makes a change to a destination database, such as database 142 or database 146, according to the redo record of the message.

The techniques used for shared queue 104 may also be used in other contexts for distributing data from one publisher to multiple subscribers. For example, Really Simple Syndication (RSS) software can use the techniques of shared queue 104 to distribute information using a latch-free single publisher, multiple subscriber configuration.

Tail and Head Pointers

In some embodiments, enqueuing process 102 maintains a tail pointer 310 that indicates an entry 322 that will be the next entry for writing a message, such as entry 11 (322-11 as illustrated in FIG. 3). Therefore, when a new redo record is to be written into the shared queue 104, enqueuing process 102 locates the entry pointed to by the tail pointer 310. Enqueuing process 102 writes the new redo record to the entry pointed to by the tail pointer 310. Enqueuing process 102 advances the tail pointer 310 to point to the next entry after writing the new redo record. For example, after enqueuing process 102 writes to entry 322-11, enqueuing process 102 advances the tail pointer 310 to point to entry 322-12.

As depicted in FIG. 3, propagation senders 108, 110, and 112 each maintains a head pointer 312, 314, and 316, respectively. A propagation sender uses and maintains a head pointer to point to the next queue entry in shared queue 104 that will be read by that propagation sender. Each propagation sender uses and maintains one head pointer. No two propagation senders use or maintain the same head pointer. Each propagation sender maintains their respective head pointer by advancing the head pointer after reading an entry. For example, after propagation sender 108 reads an entry 322-5, propagation sender 108 advances the head pointer 312 to point to 322-6. Propagation sender 108 does not advance head pointers 314 or 316.

After a propagation sender reads an entry 322-M, the propagation sender will advance the head pointer to point to entry 322-1.

Latch-Free Shared Queue

Shared queue 104 offers greater efficiency, as described herein, by not using global atomic primitives or latches. Shared queue 104 is latch-free because the publisher enqueuing process 102 and the subscribers propagation senders 108, 110, 112 do not need to take a latch on the shared queue prior to performing an operation on the shared queue. Enqueuing process 102 need not take a latch prior to enqueuing an entry into shared queue 104. Each of propagation senders 108, 110, 112 need not take a latch prior to reading an entry or dequeuing an entry from shared queue 104. The algorithm operates latch-free because each subscriber only modifies that subscriber's respective head pointer, and the tail pointer is only modified by enqueuing process 102. There is no more than one writer for the tail pointer or for each subscriber's respective individual head pointer.

In an embodiment, shared queue 104 is implemented without using global atomic primitives. For example, such global atomic primitives that are not used include compare and swap, or load/link. Global atomic primitives are implemented by hardware and the operating system, and are equivalent to latches at a hardware level. Global atomic primitives have a performance cost. For example, using a global atomic primitive may lock down an entire memory bus while performing an operation on shared queue 104. Latches might be implemented using global atomic primitives. By not using global atomic primitives, the algorithm for shared queue 104 as described herein offers greater efficiency.

Logical Circular Queues

Figure 4:
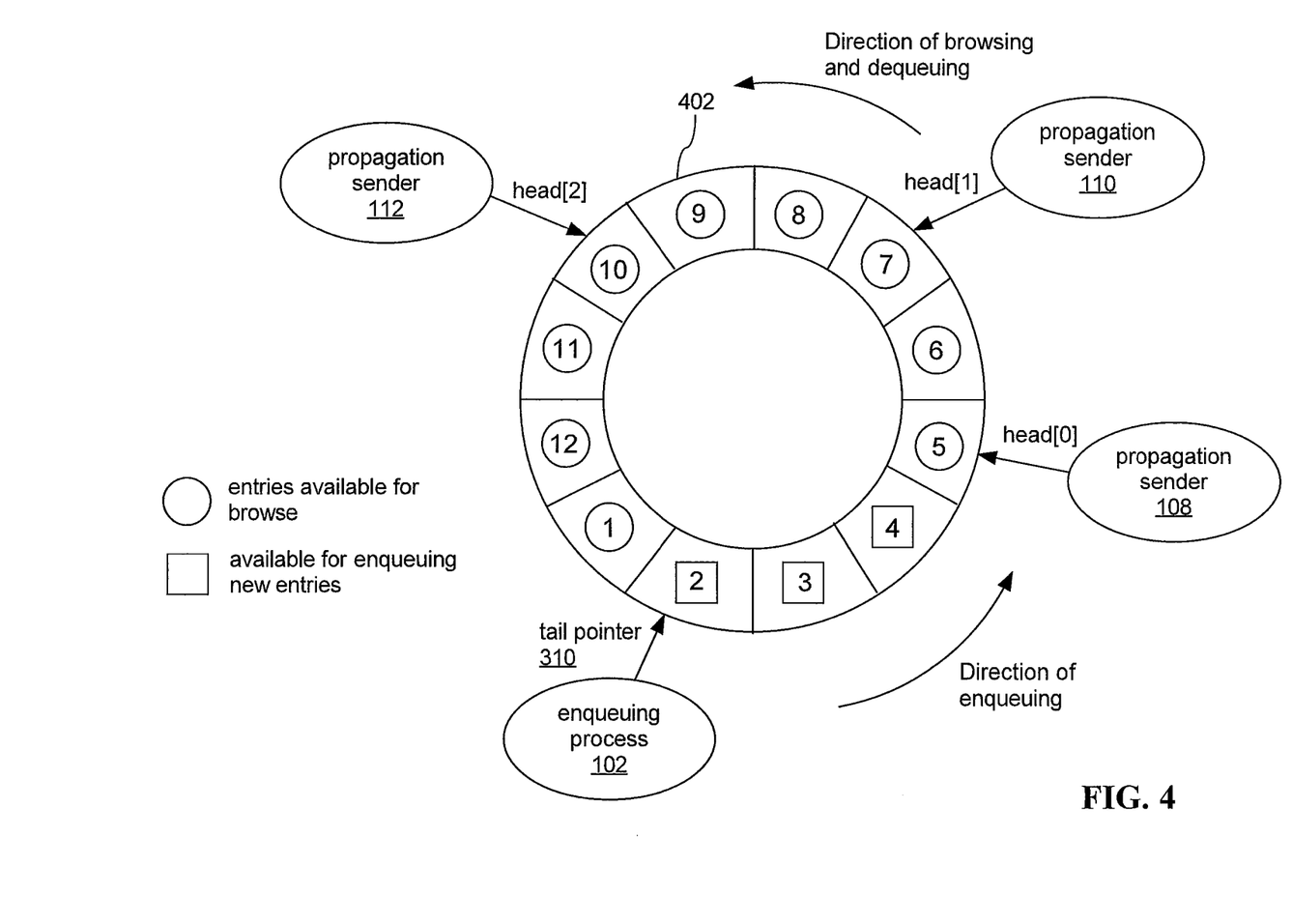
FIG. 4 depicts a logical representation of an example shared queue, which is a fixed-sized circular queue with one publisher and multiple subscribers, according to an embodiment.

FIG. 4 depicts a logical representation of an example shared queue, which is logically a set of fixed-sized circular queues, according to an embodiment. In some embodiments, the set of logical fixed-size circular queues may be implemented as a single fixed-size circular buffer with M entries, where M is greater than one. In FIG. 4, the number of entries M in the depicted circular queue 402 is 12. Thus, FIG. 4 depicts logical circular queue representations of shared queue 104 with M=12. In an embodiment, all of entries 322 may be represented by an array items[0] . . . items[M−1], such that entry one is represented by items[0] and entry M is represented by items[M−1]. A publisher (such as enqueuing process 102) uses tail pointer 310 to point to the next free entry. Although an embodiment is described herein where the example shared queue is logically represented as a circular queue, embodiments of the invention are not limited to logically circular queues. In some embodiments, shared queue 104 is implemented using storage space that is virtually infinite, without storing entries in logically circular queues.

As depicted in FIG. 4, propagation sender 108 may use head[0] to browse from entries 5 to 1, going counterclockwise around the logical circular queue. Propagation sender 110 may use head[1] to browse from entries 7 to 1, going counterclockwise around the logical circular queue. Propagation sender 112 may use head[2] to browse from entries 10 to 1, going counterclockwise around the logical circular queue. Enqueuing process 102 may use tail pointer 310 to enqueue at entries 2 to 4, going counterclockwise around the logical circular queue.

Assuming that C represents the number of subscribers, each of the subscribers has a head pointer to point to the next queue entry to be consumed in shared queue 104, as shown in FIG. 4. For example, after reading a queue entry from shared queue 104, propagation sender 108 updates a head pointer for propagation sender 108 to point to the next queue entry message that follows the most recently read queue entry. An array head[0], . . . , head[C−1] contains the head pointers for each of the subscribers. The semantics of the shared queue 104 includes C logical queues, Q[0] . . . Q[C−1], such that queue Q[i] is empty[i], if head[i]==tail;
[items[head[i]], items[head[i]+1 mod M], . . . items[tail−1 mod M]], otherwise.

In some embodiments, a logical queue Q[i] is considered full if and only if for some subscriber i, length(Q[i])==M−1, or equivalently, head[i]==tail+1 mod M, where tail represents the entry pointed to by tail pointer 310.

Shared Queue Algorithm

As explained above, shared queue 104 may be logically a set of circular queues, where the size C of the set of queues is equal to the number of subscribers. Each of the logical circular queues is, in effect, a view of shared queue 104 by one respective subscriber. Operations on shared queue 104 may simply be referred to as "queue operations" herein. Queue operations are as summarized below, according to an embodiment. See below for the pseudo code.

Enqueue: The publisher, such as enqueuing process 102, invokes enqueue to add an item to each of the C logical queues of the subscribers. The publisher waits if the queue is full.

Browse: Each subscriber, such as propagation sender 108, invokes browse to get the first item in the subscriber's logical queue, or waits if the subscriber's logical queue is empty. The returned item is immutable for each subscriber.

Dequeue: After browse returns an item, the subscriber is permitted to call dequeue to remove this returned item from the subscriber's logical queue. The subscriber indicates that the subscriber no longer references the memory of the browsed item once the subscriber calls dequeue. Hence, the publisher is free to recycle the memory of consumed items.

The shared queue is wait-free because each action, or operation, is guaranteed to be completely performed in a bounded number of steps under the appropriate circumstance. The shared queue is wait-free whenever the subscriber or publisher can perform an action, or operation, such as enqueue, read (by calling browse function), or dequeue. The publisher can perform an action, such as enqueue, without waiting whenever the queue is not full. The subscriber can perform an action, such as read or dequeue, without waiting whenever the logical queue for the subscriber is not empty. The algorithm relies only on atomic reads and writes to memory, and uses a fixed-sized buffer.

The wait operations shown in the pseudocode are all bounded time operations so that, if a notification is missed, the relevant operation does not hang. In some embodiments, additional wakeup flags are used to limit the odds of a lost notification.

Algorithm pseudocode

```
1.   void enqueue (void * new_item)
2.     for i in 0 .. C-1
3.       while head[i] == tail + 1 mod M
4.         wait
5.     items[tail] = new_item
6.     tail = tail + 1 mod M
7.     for i in 0 .. C-1
8.       if tail == head[i] + 1 mod M
9.         notify subscriber i
10.  end enqueue
11.
12.  void *browse (int i)
13.    while head[i] == tail
14.      wait
15.    return items[head[i]]
16.  end browse
17.
18.  void dequeue (int i)
19.    boolean last = false
20.    head[i] = head[i] + 1 mod M
21.    if head[i] == tail + 2 mod M
22.      last = true
23.      for j in 0 .. C-1
24.        if head[j] == tail + 1 mod M
25.          last = false
26.          break
27.    if last == true
28.      notify publisher
29.  end dequeue
```

Algorithm Operation and Safety

The enqueue code proceeds as follows, according to an embodiment. Lines 2-4 cause enqueue to wait if any of the subscribers have a full logical queue. Since the publisher invokes enqueue, the publisher will wait if any of the subscribers have a full logical queue. In some embodiments, a subscriber is considered to have a full logical queue if the tail pointer 310 and the head pointer of the subscriber points to adjacent entries. In other words, the tail pointer 310 has caught up with the head pointer and the publisher cannot enqueue any more entries until the subscriber dequeues an entry. In some embodiments, when a process waits, such as when the publisher waits or when a subscriber waits, no more CPU processing cycles are used for the waiting process until the process stops waiting. A process that is waiting is also alternatively described as a process that is sleeping. The process sleeps until another process wakes up the sleeping process. Thus, if a publisher such as enqueuing process 102 waits, that means enqueuing process 102 sleeps until a subscriber wakes up enqueuing process 102. If a subscriber sleeps, that means the subscriber sleeps until the publisher wakes up the subscriber.

The publisher, such as enqueuing process 102, invokes the enqueue function. Lines 2-4 ensure the publisher process will go to sleep if any of the subscribers have a full logical queue by checking that none of the logical queues of the subscribers is full. Since a subscriber cannot modify the subscriber's logical queue from not full to full, on reaching Line 5 the queue is not full. Since none of the logical queues refer to items[tail], line 5 has no effect on the semantics of the queue. However, line 5 atomically adds the new item to all the logical queues. This is the linearization point of the enqueue operation (the write to tail). Line 6 advances the tail. The rest of the enqueue code (lines 7 to 9) checks if any subscriber has only one item in the subscriber's logical queue. If so, the subscriber is woken up since the subscriber might have been waiting on an empty queue.

Each subscriber individually invokes the browse function. Each subscriber passes a value of the argument "int i" that identifies which subscriber is calling the browse function. The browse code in lines 13 and 14 causes the invoking subscriber to wait while the logical queue of the invoking subscriber is empty. Once the queue becomes non-empty, none of the other concurrent operations can make this logical queue empty. Hence, upon reaching line 15, the subscriber's logical queue is not empty, and browse may correctly return items[head[i]] as the first item. The linearization point of browse is the read of tail on line 13 such that the loop condition is false.

Each subscriber individually invokes the dequeue function. Each subscriber passes a value of the argument "int i" that identifies which subscriber is calling the dequeue function. Since a subscriber invokes dequeue after browse, and no concurrent operation can make this subscriber's queue empty, the queue is not empty when the dequeue operation is invoked. Thus, on line 20 the first item is dequeued from the subscriber's logical queue. The write to head[i] on line 20 is the linearization point of dequeue. On line 21, dequeue checks if the subscriber's logical queue has M−2 items. If so, the subscriber has just gone from full to not full. In that case, the time might be appropriate to wake up the sleeping publisher. However, lines 23-26 check to see if there is any other subscriber with a logical queue that has M−1 items. The subscriber will not wake up the publisher if there is any other subscriber with a logical queue that has M−1 items, since M−1 items in a logical queue means such other subscriber has a full queue.

In some embodiments, if a subscriber fails or slows down, the problems with the failed or slowed subscriber can be automatically detected. To prevent the enqueue routine from waiting too long due to a full logical queue of the failed or slowed subscriber, the subscriber is set aside with a cloned enqueuing process, to minimize the impact to the other subscribers. Setting aside the subscriber is possible if the application does not require all subscriber to be on the same latency.

Algorithm Liveness

If the queue is not full at any point, then the enqueue operation will eventually exit the loop in lines 2-4 since no other concurrent operation can make the queue full. Similarly, the browse operation eventually exits from the loop in lines 13-14 if the queue is not empty since no other concurrent operation can make the queue empty. The latch-free queues do not require notifications for liveness since all the waits are for a bounded time.

Source Instance Numbers

In an embodiment, enqueuing process 102 automatically includes, as part of an entry in shared queue 104, some identifying property of a source instance that is the source of the change described in the message of the entry. In an embodiment, this instance property is a source instance number, which identifies the instance that made the change described in the message. The instance that made the change described in the message is also known as the source instance. Each message in a stream of messages reads from shared queue 104 includes, among other things, both a redo record and a source instance number for the change information of the redo record. Including the source instance number in a message allows for more scalable data replication, because, using only enqueuing process 102, the messages may be partitioned by source instance number when propagation senders read from shared queue 104 and send the messages to apply processes. The work involved in applying messages may be distributed among a plurality of apply processes using the sources instance numbers. Thus, partitioning messages allows for greater scalability in data replication throughput and greater throughput in other applications as well. In many cases, the total throughput may be limited only by log mining.

Filtering Messages

In an embodiment, propagation senders 108, 110, and 112 automatically partition by filtering messages from shared queue 104, such that only apply processes that are supposed to apply a message will receive that message. For example, as depicted in FIG. 1, instance 132 is a replica of instance 106A, and only those changes that are from instance 106A should be applied by instance 132. Apply 126 should receive only messages with changes made in instance 106A. Thus, propagation sender 108 automatically sends only messages representing changes made by instance 106A to apply 126. Messages that do not represent changes made by instance 106A are discarded. The partitioning of messages is transparent because the database application need not be specially modified for the partitioning to occur. In an embodiment, each propagation sender uses source instance numbers to automatically filter messages for a respective apply process.

A database administrator may set filtering rules for the partitioning. The database administrator may configure one apply process for each source instance, for applying changes that were performed at the source instance. A source instance is a database instance that makes changes to database 140, where the changes are represented as messages in messages sent to apply processes. In some embodiments, an apply process may be configured to handle messages from multiple source instances because the apply process has more computing resources available.

To continue the example above, apply 126 receives messages, and applies the messages at instance 132. Apply 126 does not receive messages representing changes made by instance 106B or instance 106C because propagation sender 108 filters out messages with messages representing changes made by instance 106B or instance 106C. Likewise, if instance 134 is a replica of instance 106B, and instance 136 is a replica of instance 106C, then the propagation sender 110 of instance 134 sends only messages representing changes made by instance 106B. The propagation sender 112 of instance 136 sends only messages representing changes made by instance 106C.

Apply Failover and Recovery

In some embodiments, an apply process may apply messages to instances that already have another assigned apply process. For example, upon the failure of one of the instances 132, 134, or 136, messages that are normally sent to the apply assigned for the failed instance are transparently forwarded to another apply assigned for another instance. For example, if instance 136 abnormally terminates, the messages that are normally filtered and sent to apply 130 may all be forwarded to apply 128. The forwarding of messages is transparent, and so no human intervention is necessary.

In an embodiment, enqueuing process 102 receives data regarding apply processes 126, 128, and 130 that allows for recovery in case of failure. Enqueuing process 102 may receive the data in response to a request sent from enqueuing process 102 to apply processes. Enqueuing process 102 maintains data regarding which apply processes receive messages that are stored in shared queue 104. Enqueuing process 102 may receive data, from the apply processes, that lists which entries in shared queue 104 apply processes 126, 128, and 130 have previously applied. In some embodiments, enqueuing process 102 maintains data that indicates which entries have been received by each apply process, and maintains data that indicates which entries have not been received by each apply process. Enqueuing process 102 communicates with apply processes, via propagation senders and propagation receivers, to receive data that identifies the last entry in shared queue 104 each apply process has received before a system failure. Enqueuing process 102 can thus use the received data to enqueue, once more, messages that an apply process has not yet received, where such messages are lost from shared queue 104 during a failure.

Logical Replication Across Racs

In an embodiment, apply processes 126, 128, and 130 apply the received messages at a logical level. For example, apply 126 applies messages with changes originating from instance 106A to instance 132 at a logical level. If the changes are to a table at source instance 106A, then apply 126 applies the changes to a table for instance 132. The apply process 126 may perform replication of changes originating from source instance 106A to target instance 132 by making changes to rows. Apply 126 may use SQL statements to apply changes to target instance 132. Because the changes are applied at a logical level, database 142 remains open for writing or for making changes.

Diverse Uses and Configurations

The messages distributed from enqueuing process 102 need not be used for replication. In some embodiments, the messages distributed from enqueuing process 102 are only recorded to a file. In some embodiments, the messages distributed from enqueuing process 102 are used for auditing. In some embodiments, the messages distributed from enqueuing process 102 are stored as part of a data warehouse. In some embodiments, changes made to database 142 can be replicated at database 140 in the same manner that changes made to database 140 can be replicated at database 142. In some embodiments, not all tables written to in database 140 are replicated at database 142.

In some embodiments, instances at destination nodes are configured differently than source instances. For example, changes originating from three instances may be applied only in two instances. Depending on the implementation, there may be more apply processes and instances at destination nodes than source instances, or there may be less apply processes and instances at destination nodes than source instances. Depending on the application needs, the destination nodes may utilize shared nothing database clusters, shared disk architectures, or shared memory architectures. In a shared nothing cluster configuration, the streams can have disjoint data, some shared data, or all shared data. The approaches described herein are applicable in database configurations that include hub-and-spoke and N-way masters, with N>=3.

Global Low Watermark

In some cases, a database application might not be allowed to perform some operations unless all the apply processes have reached a certain state of progress. In an embodiment, each apply process 126, 128, 130 publishes a low watermark, which indicates the last System Change Number (SCN) that was applied by the apply process. A SCN uniquely identifies, in incremental order, each data change operation that is performed in one or more source instances at source nodes. A database application may use the SCN as an indicator of the state of progression of applying messages by an apply process. The database application derives a global low watermark from the published low watermarks by determining the minimum published low watermark. The minimum published low watermark is the global low watermark, and is the lowest SCN value published by all the apply processes. The database application that derives the global low watermark is assured that all the apply processes have reached a state corresponding to the global low watermark.

In one example application, after bulk loading into a source database, a program examines the current SCN at the source nodes and queries the global low watermark at the destination nodes. When the global low watermark rises above the SCN taken at the source nodes, the program instructs relevant applications to query the destination databases. Alternatively, relevant applications running at the source nodes can be switched to the destination nodes if needed.

Implementation Mechanisms—Hardware Overview

Figure 5:
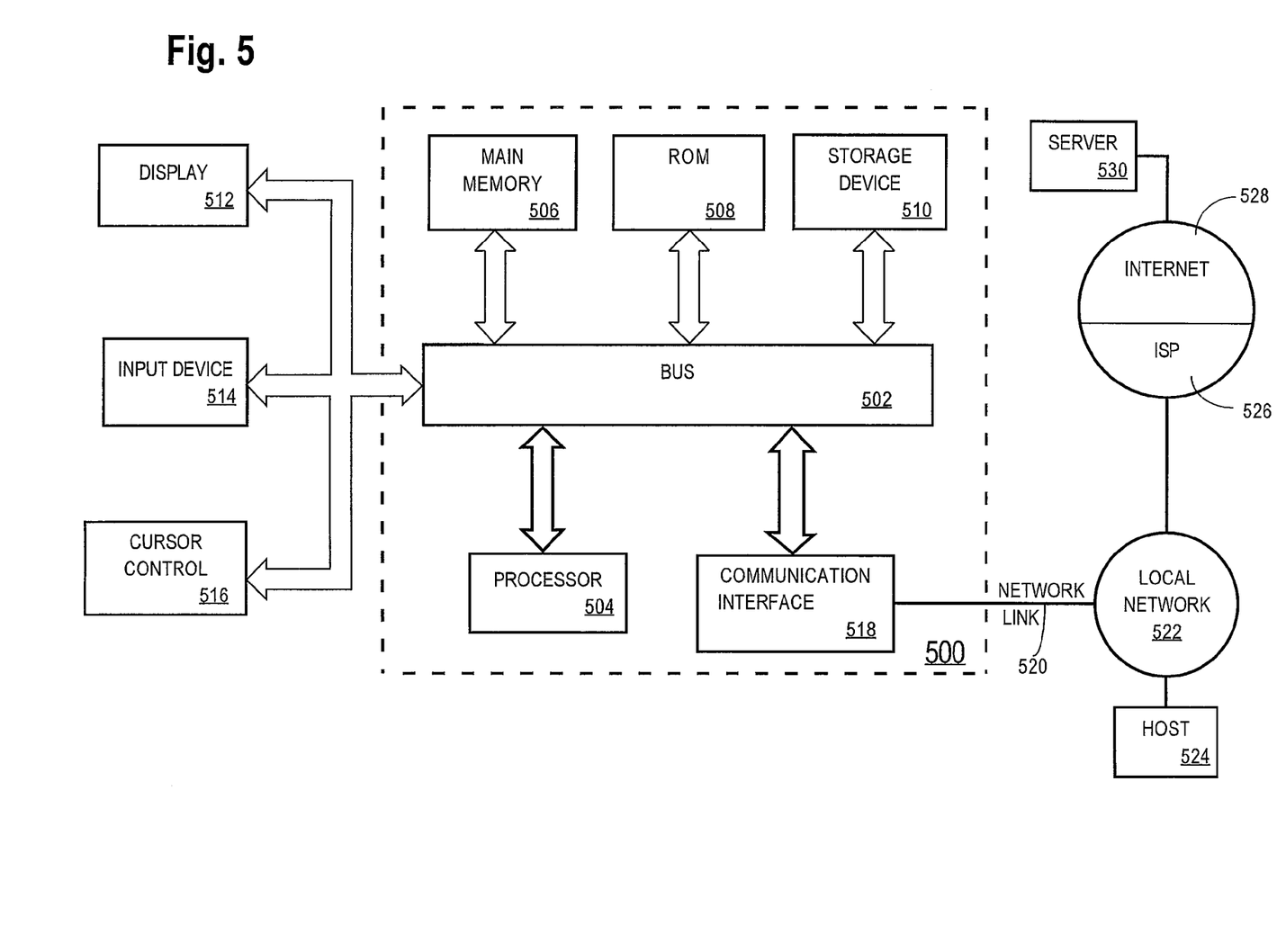
FIG. 5 is a block diagram of a system upon which the techniques described herein may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for propagating messages in a multi-node system comprising multiple nodes, comprising:
   at a source node, an enqueuing process enqueuing multiple messages into a shared queue without acquiring a latch on said shared queue;
   wherein the shared queue is only enqueued by the enqueuing process;
   at said source node, each dequeuing process of multiple dequeuing processes dequeuing said multiple messages from said shared queue, wherein said each dequeuing process of said multiple dequeuing processes dequeues said multiple messages without waiting for other dequeuing processes to finish operations on said shared queue, wherein said each dequeuing process maintains a respective pointer, in a plurality of pointers, for reading a queue entry in said shared queue to dequeue.

2. The method of claim 1, wherein for each dequeuing process of said multiple dequeuing processes, said each dequeuing process communicating a message dequeued from said shared queue to a destination node different than said source node.

3. The method of claim 2, wherein each dequeuing process of said multiple dequeuing processes communicates a dequeued message to a different destination node different than another destination node of another dequeuing process of said multiple dequeuing processes.

4. The method of claim 1,
   wherein for a first dequeuing process of said multiple dequeuing processes:
      said first dequeuing process dequeuing a particular message from said shared queue,
      determining that said particular message does not satisfy first one or more criteria,
      in response to determining that a particular message does not satisfy first one or more criteria, forgoing forwarding said particular message to a destination node; and
   wherein for a second dequeuing process of said multiple dequeuing processes:
      said second dequeuing process dequeuing said particular message from said shared queue;
      determining that said particular message does satisfy second one or more criteria; and
      in response to determining that said particular message does ":z satisfy second one or more criteria, forwarding said particular message to a destination node.

5. The method of claim 1, wherein each dequeuing process of said multiple dequeuing processes applies changes of a message of said multiple messages to a database at a logical level.

6. The method of claim 1, wherein each message of said multiple messages includes information that identifies an instance that is a source of changes represented by said each message.

7. The method of claim 1, wherein each dequeuing process of said multiple dequeuing processes is guaranteed to completely perform a dequeuing operation on said shared queue within a bounded number of steps whenever there is at least one entry in said shared queue.

8. A method for distributing messages in a multi-node database system, said multi-node database system comprising a certain node, said method comprising:
   an enqueuing process on said certain node enqueuing each message of a plurality of messages to a shared queue;
   each propagation sender of a plurality of propagation senders dequeuing each message of said plurality of messages from said shared queue;
   wherein each propagation sender of said plurality of propagation senders dequeues said plurality of messages from said shared queue without waiting for other propagation senders of said plurality of propagation senders to finish operations on said shared queue;
   wherein each propagation sender of said plurality of propagation senders maintains a respective pointer, in a plurality of pointers, for reading a queue entry in said shared queue to dequeue;

each propagation sender sending respective one or more messages of said plurality of messages to a respective apply process of a plurality of apply processes on a respective second node of said multi-node system; and wherein each respective apply process of said plurality of apply processes applies the respective one or more messages to a database.

9. The method of claim 8, further comprising each respective propagation sender of said plurality of propagation senders advancing a respective head pointer to point to a next message after dequeuing a message of said plurality of messages.

10. The method of claim 8, further comprising a propagation sender of said plurality of propagation senders waking said enqueuing process if no other propagation sender has a full logical queue.

11. The method of claim 8, wherein each propagation sender of said plurality of propagation senders maintains a head pointer for reading messages from said shared queue.

12. The method of claim 8, wherein said enqueuing process waits if any propagation sender has a full logical queue.

13. The method of claim 8, further comprising each apply process of said plurality of apply processes publishing a low watermark, wherein said low watermark may be used to determine a global low watermark.

14. The method of claim 8, wherein a logical representation of said shared queue is a set of circular queues.

15. The method of claim 8, wherein the enqueuing process is guaranteed to completely perform an enqueue operation on said shared queue within a bounded number of steps whenever the shared queue is not full.

16. The method of claim 8, wherein at least one message of said plurality of messages includes information that identifies an instance at a source node that is a source of changes represented by said at least one message.

17. The method of claim 8, further comprising:
in response to a termination of an instance at a destination node, sending messages representing changes that were made by an instance at a source node to an apply process, wherein prior to termination of the instance at the destination node, the messages representing changes that were made by the instance at the source node were not sent to the apply process.

18. The method of claim 8, further comprising:
wherein said multi-node system comprises one or more clustered database systems;
wherein said certain node is logically part of a source clustered database system;
wherein said database is logically part of a destination clustered database system.

19. A non-transitory computer-readable medium storing sequences of instructions which, when executed by one or more processors, cause:
at a source node, an enqueuing process enqueuing multiple messages into a shared queue without acquiring a latch on said shared queue;
wherein the shared queue is only enqueued by the enqueuing process;
at said source node, each dequeuing process of multiple dequeuing processes dequeuing said multiple messages from said shared queue, wherein said each dequeuing process of said multiple dequeuing processes dequeues said multiple messages without waiting for other dequeuing processes to finish operations on said shared queue;

wherein said each dequeuing process maintains a respective pointer, in a plurality of pointers, for reading a queue entry in said shared queue to dequeue.

20. The non-transitory computer-readable medium of claim 19, wherein the sequences of instructions further comprise instructions which, when executed by one or more processors, cause each dequeuing process of said multiple dequeuing processes to communicate a message dequeued from said shared queue to a destination node different than said source node.

21. The non-transitory computer-readable medium of claim 19, wherein the sequences of instructions further comprise instructions which, when executed by one or more processors, cause each dequeuing process of said multiple dequeuing processes to communicate a dequeued message to a different destination node different than another destination node of another dequeuing process of said multiple dequeuing processes.

22. The non-transitory computer-readable medium of claim 19, wherein the sequences of instructions further comprise instructions which, when executed by one or more processors, cause:
a first dequeuing process of said multiple dequeuing processes (i) dequeuing a particular message from said shared queue, (ii) determining that said particular message does not satisfy first one or more criteria, and (iii) in response to determining that a particular message does not satisfy one or more criteria, forgoing forwarding said particular message to a destination node; and
a second dequeuing process of said multiple dequeuing processes (iv) dequeuing said particular message from said shared queue, (v) determining that said particular message does satisfy second one or more criteria, and (vi) in response to determining that said particular message does--sirs satisfy second one or more criteria, forwarding said particular message to a destination node.

23. The non-transitory computer-readable medium of claim 19, wherein the sequences of instructions further comprise instructions which, when executed by one or more processors, cause each dequeuing process of said multiple dequeuing processes to apply changes of a message of said multiple messages to a database at a logical level.

24. The non-transitory computer-readable medium of claim 19, wherein each message of said multiple messages includes information that identifies an instance that is a source of changes represented by said each message.

25. The non-transitory computer-readable medium of claim 19, wherein the sequences of instructions further comprise instructions which, when executed by one or more processors, cause each dequeuing process of said multiple dequeuing processes to be guaranteed to completely perform a dequeuing operation on said shared queue within a bounded number of steps whenever there is at least one entry in said shared queue.

26. A non-transitory computer-readable medium storing sequences of instructions for distributing messages in a multi-node database system, said multi-node database system comprising a certain node, said sequences of instructions which, when executed by one or more processors, cause:
an enqueuing process on said certain node enqueuing each message of a plurality of messages to a shared queue;
each propagation sender of a plurality of propagation senders dequeuing each message of said plurality of messages from said shared queue;
wherein each propagation sender of said plurality of propagation senders dequeues said plurality of messages from said shared queue without waiting for other propagation senders of said plurality of propagation senders to finish operations on said shared queue;

wherein each propagation sender of said plurality of propagation senders maintains a respective pointer, in a plurality of pointers, for reading a queue entry in said shared queue to dequeue;

each propagation sender sending respective one or more messages of said plurality of messages to a respective apply process of a plurality of apply processes on a respective second node of said multi-node system; and wherein each respective apply process of said plurality of apply processes applies the respective one or more messages to a database.

27. The non-transitory computer-readable medium of claim 26, wherein the sequences of instructions further comprise instructions which, when executed by one or more processors, cause: advancing, by each respective propagation sender of said plurality of propagation senders, a respective head pointer to point to a next message after dequeuing a message of said plurality of messages.

28. The non-transitory computer-readable medium of claim 26, wherein the sequences of instructions further comprise instructions which, when executed by one or more processors, cause a propagation sender of said plurality of propagation senders waking said enqueuing process if no other propagation sender has a full logical queue.

29. The non-transitory computer-readable medium of claim 26, wherein the sequences of instructions further comprise instructions which, when executed by one or more processors, cause each propagation sender of said plurality of propagation senders to maintain a head pointer for reading messages from said shared queue.

30. The non-transitory computer-readable medium of claim 26, wherein the sequences of instructions further comprise instructions which, when executed by one or more processors, cause said enqueuing process to wait if any propagation sender has a full logical queue.

31. The non-transitory computer-readable medium of claim 26, wherein the sequences of instructions further comprise instructions which, when executed by one or more processors, cause each apply process of said plurality of apply processes to publish a low watermark, wherein said low watermark may be used to determine a global low watermark.

32. The non-transitory computer-readable medium of claim 26, wherein a logical representation of said shared queue is a set of circular queues.

33. The non-transitory computer-readable medium of claim 26, wherein the enqueuing process is guaranteed to completely perform an enqueue operation on said shared queue within a bounded number of steps whenever the shared queue is not full.

34. The non-transitory computer-readable medium of claim 26, wherein said message includes information that identifies an instance at a source node that is a source of changes represented by said message.

35. The non-transitory computer-readable medium of claim 26, wherein the sequences of instructions further comprise instructions which, when executed by one or more processors, cause:

in response to a termination of an instance at a destination node, sending messages representing changes that were made by an instance at a source node to an apply process, wherein prior to termination of the instance at the destination node, the messages representing changes that were made by the instance at the source node were not sent to the apply process.

36. The non-transitory computer-readable medium of claim 26, wherein said multi-node system comprises one or more clustered database systems;

wherein said certain node is logically part of a source clustered database system;

wherein said database is logically part of a destination clustered database system.

\* \* \* \* \*

UNITED STATES PATENT AND TRADEMARK OFFICE
CERTIFICATE OF CORRECTION

PATENT NO. : 9,230,002 B2
APPLICATION NO. : 12/363557
DATED : January 5, 2016
INVENTOR(S) : Wong et al.

Page 1 of 1

It is certified that error appears in the above-identified patent and that said Letters Patent is hereby corrected as shown below:

In the specification

In column 4, line 40, after "until" delete "a" and insert -- an --, therefor.

In column 10, line 9, delete "Line" and insert -- line --, therefor.

In the claims

In column 16, line 36, in claim 4, after "does" delete "':z".

In column 18, line 35, in claim 22, delete "does--sirs" and insert -- does --, therefor.

Signed and Sealed this
Sixteenth Day of August, 2016

Michelle K. Lee
*Director of the United States Patent and Trademark Office*